Nov. 2, 1926.  
H. B. BLISS  
LEVELING INSTRUMENT  
Filed March 13, 1924   2 Sheets-Sheet 1  
1,605,698
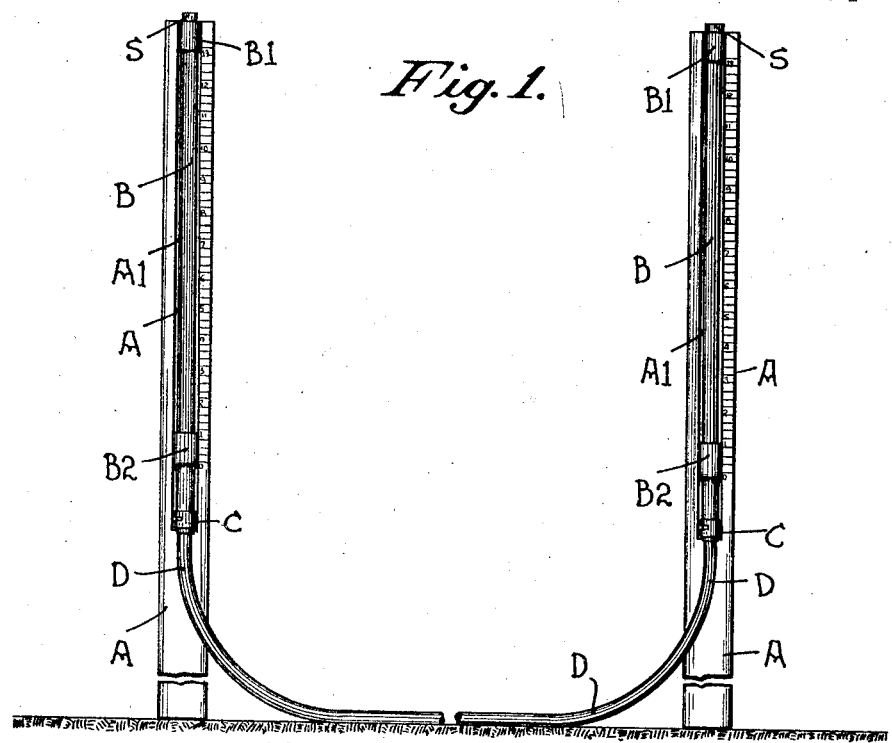
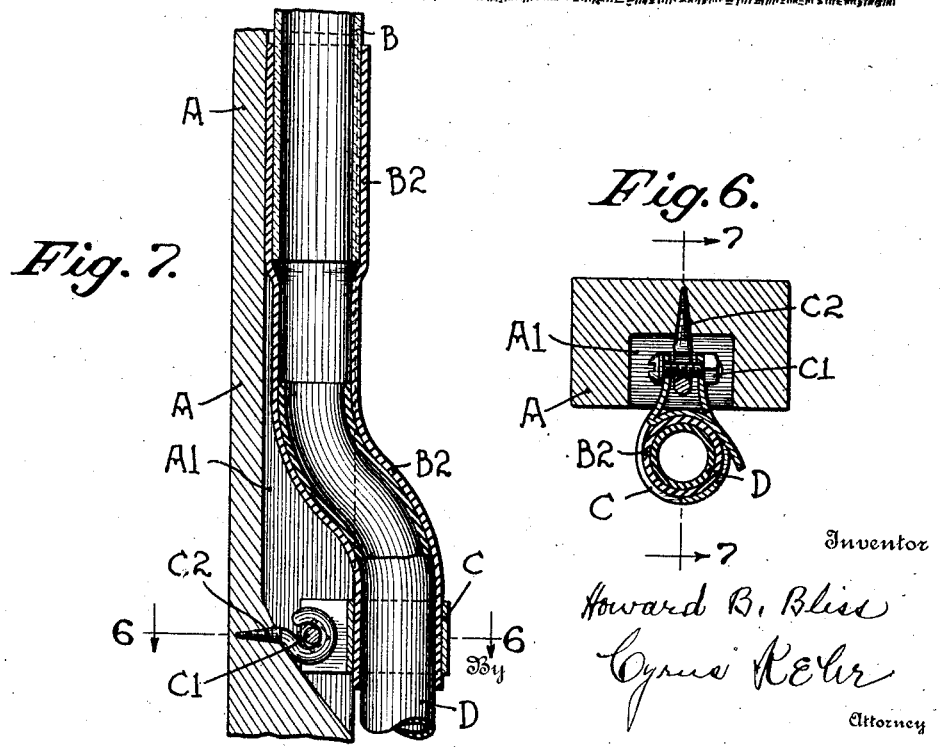
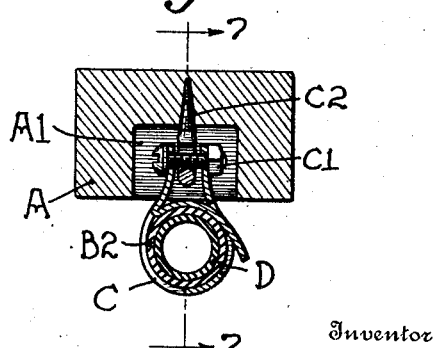
Inventor  
Howard B. Bliss  
Cyrus Kehr  
Attorney Nov. 2, 1926.    H. B. BLISS    1,605,698
LEVELING INSTRUMENT
Filed March 13, 1924    2 Sheets-Sheet 2
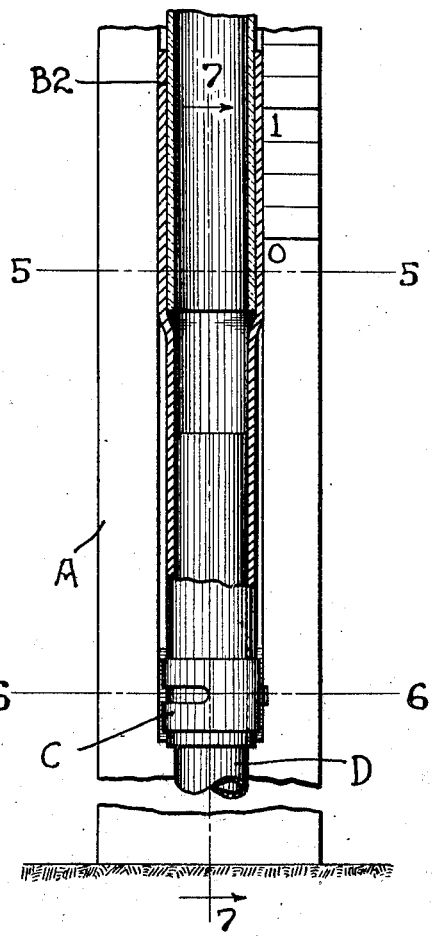
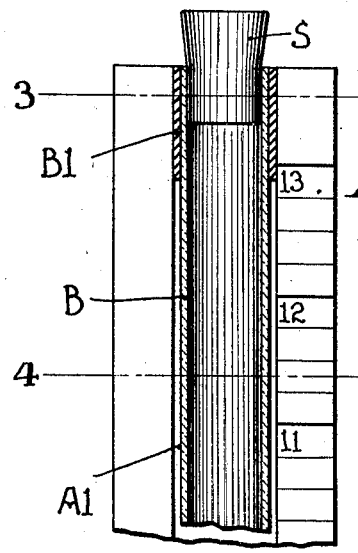
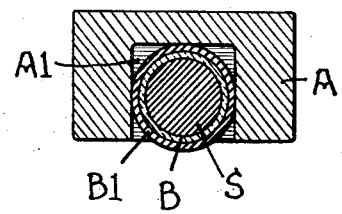
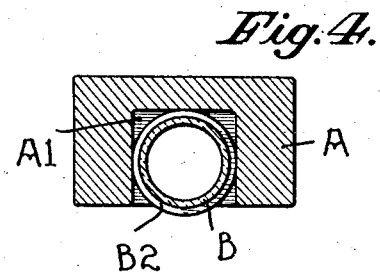
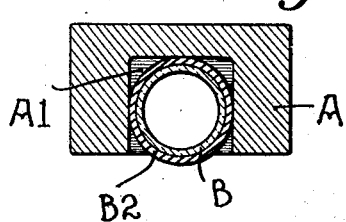
Inventor
Howard B. Bliss
Cyrus Kehr
Attorney Patented Nov. 2, 1926.

1,605,698

UNITED STATES PATENT OFFICE.

HOWARD B. BLISS, OF KNOXVILLE, TENNESSEE.

LEVELING INSTRUMENT.

Application filed March 13, 1924. Serial No. 699,024.

My improvement relates particularly to levels or leveling instruments especially adapted for use over short distances, as to ascertain levels or grades needed for the terracing of land which is so steep as to require terracing to control the run-off of storm water to prevent washing of the soil. The instrument is also adapted to be used for fixing grades for drainage ditches and other forms of drains. The instrument is also adapted to be used for taking levels for the making of topographical maps of relatively small tracts of land, and also for taking levels for the erection of foundations for buildings.

The object of the invention is to produce such an instrument which may be cheaply constructed and which is in a form adapted to make its use simple for the taking of levels on limited areas of land. Prime considerations are economical construction, and simple operation.

The instrument comprises two upright members and a flexible, tubular connecting member leading from one of said upright members to the other. Each upright member comprises a transparent tube secured to the body of the upright member and joined to the connecting member.

In the accompanying drawings,

Fig. 1 is a general view, on a small scale, of an instrument embodying my improvement;

Fig. 2 is a larger view of one of the upright members, parts being broken away;

Fig. 3 is a horizontal section on the line, 3—3, of Fig. 2;

Fig. 4 is a horizontal section on the line, 4—4, of Fig. 2;

Fig. 5 is a horizontal section on the line, 5—5, of Fig. 2;

Fig. 6 is a horizontal section on the line, 6—6, of Figs. 2 and 7;

Fig. 7 is an upright section on the line, 7—7, of Figs. 2 and 6, looking toward the right.

Referring to said drawings, A, A are the upright members. D is the connecting member consisting of flexible tubing, preferably a rubber tubing of small diameter.

Each of the upright members, A, is preferably formed of wood and made 3 or 4 feet high. I have found 3 feet 6 inches a convenient height, the cross section being 1 inch by 1¾ inches.

In the front face of the upright member is formed a channel, $A^1$, extending downward from the upper end of the member about 14 inches. A cylindrical glass tube, B, is placed into said channel. The upper end of said tube is about even with the upper end of the upright and is surrounded by an india-rubber sleeve, $B^1$, which fits so closely around the tube and in the channel, $A^1$, as to form a packing whereby that end of the tube is removably secured in said channel. Any suitable stopper, S, is placed into the upper end of the glass tube. The lower end of the glass tube extends to within about 4 inches of the lower end of the channel, $A^1$. A rubber tube, $B^2$, surrounds the lower end of the glass tube, B, and fits so closely to said tube and against the sides of the channels, $A^1$, as to form a packing for holding the lower end of the glass tube removably in said channel. While the glass tube may ordinarily be sufficiently secured in the channel, $A^1$, by frictional engagement between the exterior of the rubber sleeves, $B^1$ and $B^2$, liquid shellac or similar adhesive may be placed between the sleeves and the side faces in the channel, $A^1$. The lower end of the rubber tube, $B^2$, extends a short distance through the clamp, C. Said clamp is a well-known form of hose clamp. It includes a bolt, $C^1$, which extends horizontally through the eye of a screw eye, $C^2$. The tubular connecting member, D, is of such a small diameter as to allow one end to extend into the lower end of the rubber tubular member, $B^2$, the tubular member, D, and the member, $B^2$, telescoping within the clamp, C. The external diameter of the member, D, is large enough to allow the member, $B^2$, to frictionally engage and hold the connecting member, D, when the clamp, C, is tightened.

On the front face of the upright member, A, is placed a graduated scale indicating inches or other measure units by means of which the height of liquid (usually water) in the glass tube may be seen.

The two upright members or standards, A, are duplicates, one end of the connecting member, D, being joined to the rubber tube, $B^2$, of one upright member while the other end of the connecting member or tube is similarly joined to the rubber tube, $B^2$, of the other upright member.

The glass tube, B, is preferably of larger interior diameter than the interior diameter of the lower part of the rubber tube, $B^2$; while the interior diameter of the connecting member or tube, D, is still less. The interior diameter of the connecting tube is preferably only ½ or ⅓ the interior diameter of the glass tube.

The purpose of this smaller diameter in the connecting tube is to limit surging of the water from one glass tube to the other when the upright members, A, are agitated.

When the instrument is to be used, the two upright members are placed side by side at the same height. Then the stoppers, S, are removed. Then water is poured into one of the glass tubes until the connecting tube, D, is entirely filled and until the glass tubes, B, are filled to a point approximately midway between their ends, preferably to a division between two of the scale units, we will assume the line indicating six inches. Then the stoppers, S, are placed into the upper ends of the glass tubes to be withdrawn when an observation is to be made.

Assuming that the observation stations are to be 25 feet apart, the connecting tubing is to be of such length as to allow the separation of the two members, A, approximately 25 feet and no more. After the instrument has been partially filled with water as above described, one of the members, A, is held by one attendant at the initial station while the other member, A, is carried by another attendant in the general direction of a place for a second station. If the fall is to be two inches in 25 feet, the instrument is moved up or down the slope until the column of water in the glass tube stands at 7 inches. The water having been brought to 6 inches in both glass tubes before work began, when the forward member, A, has been thus set to indicate 7 inches, the column of liquid in the glass tube of the other member, A, will have fallen to 5 inches. Hence the forward member, A, will have found a place which is 25 feet from the first station, on an approximately horizontal course, and two inches below the level of the first station. The instrument is next carried forward, the rear member, A, being placed on the second station and the third station being found by the method used for finding the second station. While moving the instrument from stage to stage the stoppers, S, may be replaced so tightly as to avoid loss of liquid through the upper ends of the glass tubes.

From the foregoing description of the use of the instrument for fixing grade stations for terracing land, it will be seen how the instrument may be used for fixing grades for drain ditches or for drive ways and paths or for making topographical maps of tracts of land of moderate size.

It is to be observed that this instrument is adapted to economical manufacture. Every part can be easily and cheaply made. Some of the parts are stock material. The parts are easily assembled, and any part may easily be disconnected and a new part substituted, if repairing is necessary. For example, if one of the glass tubes should be broken, that can be removed by overcoming the exterior frictional engagement of the rubber sleeves, $B^1$ and $B^2$, if said sleeves are not joined by shellac, as above described. If the shellac is present, any solvent of shellac may be applied for the softening of the shellac, after which the rubber sleeves and the glass tube may be removed and the sleeves placed on a new glass tube.

Relative to the subject of terracing, to which my instrument, on account of its simple form, is especially adapted, it is to be noted that conservation of soil is of great economic importance, and it is now recognized that terracing is a large factor in soil conservation in all localities where land is not level. In many regions of this country there is large soil erosion, chiefly by the action of storm water. It has been estimated that in the Southern States the value of soil carried away into the streams, every year, amounts to several billion dollars. It has been found that such erosion can be substantially eliminated by bringing the land surfaces to low grades by terracing. Accordingly terracing is being extensively taught to farmers by agricultural educational agencies.

Farmers can readily learn to do practical terracing by the use of my simple leveling instrument.

I claim as my invention,

1. In a leveling instrument, the combination of two upright members each having an upright channel, a glass tube in said channel, a rubber sleeve surrounding the upper end of said tube in said channel and bearing against and frictionally engaging the faces of said channel, a rubber sleeve surrounding the lower end of said glass tube and bearing against and frictionally engaging the faces of said channel and extending downward below the glass tube, a clamp binding said sleeve, a connecting tube having its ends connected, respectively, with the lower rubber sleeves, substantially as described.

2. In a leveling instrument, the combination of two upright members each having an upright channel, a glass tube in said channel, a rubber sleeve surrounding the upper end of said tube in said channel and bearing against and frictionally engaging the faces of said channel, a rubber sleeve surrounding the lower end of said glass tube and bearing against and frictionally engaging the faces of said channel and extending downward below the glass tube, a clamp binding said sleeve, a screw eye supporting said clamp, a connecting tube having its ends connected, respectively, with the lower rubber sleeves, substantially as described.

3. In a leveling instrument, the combination of two upright members each having an upright channel, a glass tube in said channel, a rubber sleeve surrounding the upper end of said tube in said channel and bearing against and frictionally engaging the faces of said channel, a rubber sleeve surrounding the lower end of said glass tube and bearing against and frictionally engaging the faces of said channel and extending downward below the glass tube, a clamp binding said sleeve, a connecting tube having its ends extending into, respectively, the last mentioned rubber sleeves, substantially as described.

4. In a leveling instrument, the combination of two upright members each having an upright channel, a glass tube in said channel, a rubber sleeve surrounding the upper end of said tube in said channel and bearing against and frictionally engaging the faces of said channel, a rubber sleeve surrounding the lower end of said glass tube and bearing against and frictionally engaging the faces of said channel and extending downward below the glass tube, a clamp binding said sleeve, a screw eye supporting said clamp, a connecting tube having its ends extending, respectively, into the lower rubber sleeves, substantially as described.

In testimony whereof I have signed my name, this 29th day of February, in the year one thousand nine hundred and twenty-four.

HOWARD B. BLISS.